Dec. 1, 1964 E. E. GUILFORD 3,159,313

MULTI-COMPONENT PROPORTIONING METER SYSTEM

Filed May 16, 1961

INVENTOR.
Earl E. Guilford
BY
Attys.

United States Patent Office 3,159,313
Patented Dec. 1, 1964

3,159,313
MULTI-COMPONENT PROPORTIONING
METER SYSTEM
Earl Eugene Guilford, Midland, Mich., assignor to The
Dow Chemical Company, Midland, Mich., a corporation of Delaware
Filed May 16, 1961, Ser. No. 110,533
3 Claims. (Cl. 222—142)

This invention relates to a system for accurately proportioning two or more fluids, which may differ in viscosity, density, etc., for delivery to a point of use which may not be constant in elevation.

In certain operations, such as when using a spray gun adapted to mix, atomize, and spray a surface with two or more paint components, the gun elevation is often of necessity changed during use. When employing available equipment incorporating paint pressure pots, such non-constant elevation, coupled with differences in viscosity, density, etc., make fluid ratios of the components difficult, or impossible to maintain.

The present invention solves the problem of maintaining fluid ratios constant with change of elevation, and when the components being mixed and sprayed, differ in viscosity, density, etc. Briefly, the inventive concept involves the use of a plurality of positive displacement pumps and meters, with appropriate control elements, all being adapted to provide a non-pulsating system which delivers desired flow ratios independent of density, viscosity and other variable factors. The control elements employed in the system maintain zero pressure difference across the meters, and leakage, or slipping of fluid through the meters is eliminated, resulting in truly volumetric metering.

The main object of this invention is to provide a system for accurately proportioning two or more fluids, which may differ in viscosity, density, etc., to a point of use which may not be constant in elevation.

Figure 1:
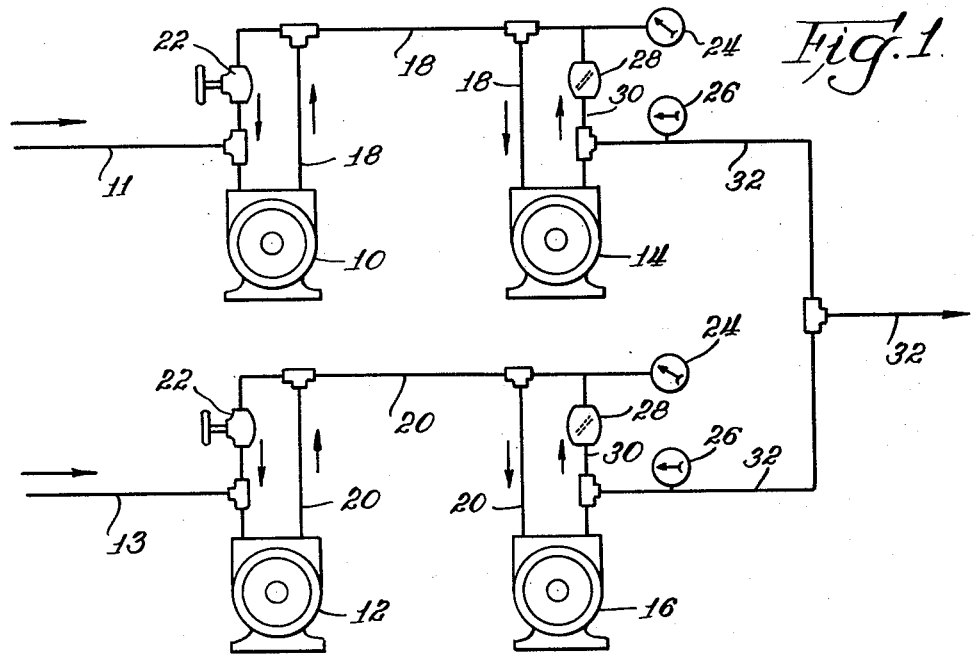
Figure 2:
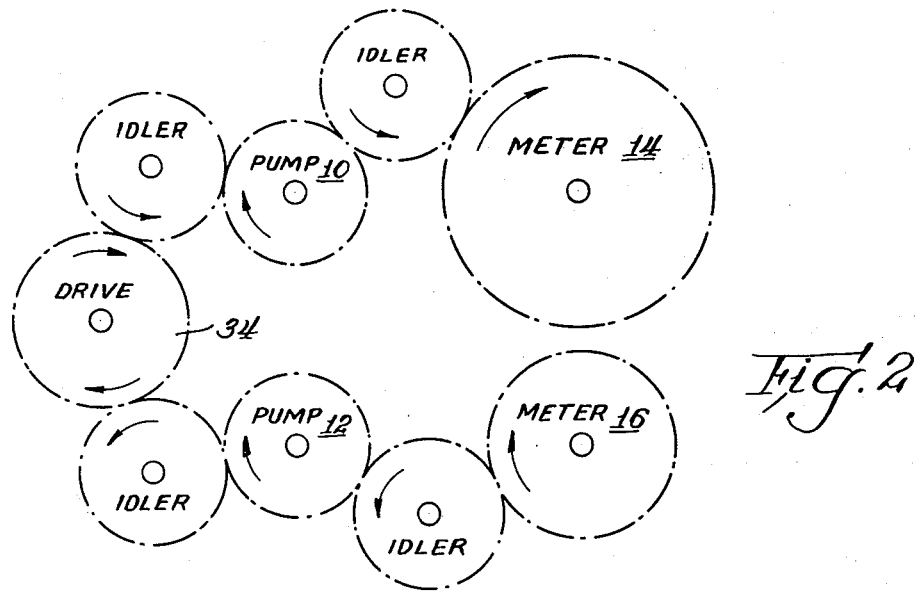

These and further objects and features of the invention will become more apparent from the following description and accompanying drawing wherein:

FIG. 1 is a schematic view showing a plurality of pumps, meters, and control elements arranged according to the principles of the invention; and FIG. 2 is a schematic view illustrating a gear arrangement as used in the system of FIG. 1.

Referring now to the drawing, two positive displacement pumps 10, 12, are shown having liquid delivery lines 11 and 13 connected therewith. Each pump 10, 12, is adapted to deliver a pressurized liquid to meters 14, 16 respectively, via pipes 18 and 20. The pumps and meters are preferably of the rotary type. Each pump is geared to displace more fluid than its associated meter will displace, so excess fluid is returned to a pump through adjustable relief valves 22, which also function as a check valve to permit one-way flow of liquid to the pump. Pressure gauges 24 and 26 are arranged on the output end of each meter, the gauge 24 being adapted for measurement of the pressure of liquid being delivered to a meter, while gauge 26 indicates pressure of liquid having a meter for delivery to a point of use. A check valve 28 is positioned in a recirculating pipe circuit 30, to allow one way flow of liquid back into a meter delivery line 18 or 20, as the case may be, when liquid flow in a common meter discharge, or outlet pipe 32 is stopped, or shut-off. The relief valves 22 are adjusted to maintain pressure at the gauges 24 always in excess of pressure at the gauges 26, when the system is delivering.

A typical gear train for operation of the system above-described, is shown in FIG. 2. The metering rate will be determined by the number of teeth in the gears for driving the meters 14 and 16, or the teeth on a drive gear 34, assuming of course that the teeth sizes are identical.

Solution of a typical problem metering two components X and Y, is illustrated by the following example. At 70° F., "X" has a viscosity of 2500 cps. and a density of $1.245/H_2O$ at 40° F., and "Y" a viscosity of 106 cps. and density of 1.165. X and Y must be combined at a ratio of 1.355X to 1Y by weight.

$$\text{Density ratio } \frac{X}{Y} = \frac{1.245}{1.165} = 1.07$$

$\frac{1.355X}{1.07} = 1.265X$ by volume to 1 volume of $Y$ $\frac{1Y}{1.265X} =$ Gear ratio necessary to meter the two components.

From the foregoing, it will be seen that a system according to the principles of the invention will attain a null type of volume measurement. When operated at the same temperature, the volume ratios will remain constant although the viscosity and/or density of the components are grossly different.

The foregoing description has been given in detail without thought of limitation since the inventive principles involved are capable of assuming other forms without departing from the spirit of the invention or the scope of the following claims.

What is claimed is:

1. A multi-component proportioning system comprising, a pair of continuous delivery positive displacement pumps, a pair of meters, one of said meters being arranged to receive liquid under pressure from one of the pumps while the other of said meters is arranged to receive liquid under pressure from the other of said pumps, a common discharge pipe for said meters, and a common drive means having gear means for said pumps and said meters, said meters being driven independently of one another and in accordance with the ratio of said gear means connected between said common drive means and each of said meters so that a predetermined ratio of liquid will be discharged by the meters.

2. A multi-component proportioning system comprising, a pair of continuous delivery positive displacement pumps, a pair of meters, one of said meters being arranged to receive liquid under pressure from one of the pumps while the other of said meters is arranged to receive liquid under pressure from the other of said pumps, a common discharge pipe for said meters, a common drive means for said pumps and said meters, first gear means connecting said common drive means and one of said pumps and its associated meter for driving said pump and said meter at a predetermined rate, and second gear means connecting said common drive means and the other one of said pumps and its associated meter for driving said pump and said meter at a predetermined rate, the output ratio between the meters being dependent upon the respective ratios of said first and second gear means so that a predetermined ratio of liquid will be discharged by the meters.

3. A multi-component proportioning system comprising, a pair of positive continuous delivery displacement pumps, a pair of meters, one of said meters being arranged to receive liquid under pressure from one of the pumps while the other of said meters is arranged to receive liquid under pressure from the other of said pumps, a common discharge pipe for said meters, valve means in cooperation with each pump for maintaining inlet pressure of the liquid into each meter greater than the pressure of the liquid being delivered by the meter into the discharge pipe, and a common drive means having gear means for said pumps and said meters, said meters being driven independently of one another and in accordance with the ratio of said gear means connected between said common drive means and each of said meters so that a predetermined ratio of liquid will be diccharged by the meters.

References Cited in the file of this patent

UNITED STATES PATENTS

| | | |
|---|---|---|
| 1,964,028 | Boynton et al. | June 26, 1934 |
| 2,564,306 | Isreeli et al. | Aug. 14, 1951 |
| 2,880,908 | Young | Apr. 7, 1959 |
| 2,898,002 | Blanchet et al. | Aug. 4, 1959 |